(12) United States Patent
Chen

(10) Patent No.: US 6,863,396 B1
(45) Date of Patent: Mar. 8, 2005

(54) SCREWLESS EYEGLASSES

(75) Inventor: Jimmy Chen, Taipei (TW)

(73) Assignee: Aswan International Corp., Taipei (TW)

( * ) Notice: Subject to any disclaimer, the term of this patent is extended or adjusted under 35 U.S.C. 154(b) by 0 days.

(21) Appl. No.: 10/831,983

(22) Filed: Apr. 26, 2004

(51) Int. Cl.⁷ ................................................ G02C 1/02
(52) U.S. Cl. ...................................... 351/110; 351/120
(58) Field of Search ............................... 351/110, 120, 351/111, 119, 41, 153, 158; 16/228

(56) References Cited

U.S. PATENT DOCUMENTS

| | | | | |
|---|---|---|---|---|
| 5,638,147 A | * | 6/1997 | Wang-Lee | 351/120 |
| 5,760,867 A | * | 6/1998 | Pernicka et al. | 351/120 |
| 6,290,356 B1 | * | 9/2001 | Chi | 351/120 |
| 6,464,353 B1 | * | 10/2002 | Spindelbalker | 351/120 |
| 6,467,902 B2 | * | 10/2002 | Wang-Lee | 351/120 |
| 6,543,896 B1 | * | 4/2003 | Huang | 351/120 |

* cited by examiner

Primary Examiner—Hung Xuan Dang
(74) Attorney, Agent, or Firm—Brinks Hofer Gilson & Lione

(57) ABSTRACT

A pair of screwless eyeglasses includes a lens assembly, two connecting rods, and two temples. The connecting rods extend respectively through two front slots in the lens assembly, and are inserted respectively into two rear slots in the temples. Two front stop units are connected respectively and fixedly to front end portions of the connecting rods, and abut respectively against two rear stop units fixed respectively within the front slots so as to prevent rearward removal of the connecting rods from the front slots. When the connecting rods rotate respectively about the front stop units toward each other so as to extend respectively through two notches in the lens assembly, the temples abut against each other.

5 Claims, 8 Drawing Sheets

SCREWLESS EYEGLASSES

BACKGROUND OF THE INVENTION

1. Field of the Invention

This invention relates to eyeglasses, and more particularly to screwless eyeglasses.

2. Description of the Related Art

Referring to FIG. 1, a pair of conventional eyeglasses 1 is shown to include a lens assembly 11, two hinge members 12 connected to the lens assembly 11 by two upright screws 13, and two temples 14 connected respectively to the hinge members 12 such that the angles of the temples 14 relative to the hinge members 12 can be adjusted.

The lens assembly 11 includes a top frame portion 111, a lens portion 112, and two front lugs 113 extending respectively and rearwardly from two opposite sides of the lens portion 112. Each of the hinge members 12 includes two vertically spaced-apart rear lugs 121, and a temple-retaining portion 122. Each of the screws 13 extends through the corresponding front lug 113 of the lens assembly 11 and the rear lugs 121 of the corresponding hinge member 12 so that the hinge members 12 can rotate relative to the lens assembly 11 toward each other. Each of the temple-retaining portions 122 of the hinge members 12 is formed with a pivot hole 123 and a rearwardly extending resilient positioning plate 124.

The temples 14 are disposed respectively behind the hinge members 12. Each of the temples 14 includes an outer wall 141, an inner wall 142 having a U-shaped cross-section and formed integrally with a rear portion of the outer wall 141, a projection 143 extending inwardly from a front portion of the outer wall 141 and disposed rotatably within the pivot hole 123 in the corresponding hinge member 12, and a plurality of positioning slots 144 formed in the rear portion of the outer wall 141. The positioning plate 124 of each of the hinge members 12 engages a selected one of the positioning slots 144 in the corresponding temples 14. As such, the temples 14 can be rotated respectively and forcibly about the pivot holes 123 in the hinge members 12 so as to adjust the angles of the temples 14 relative to the hinge members 12. However, the above-mentioned conventional eyeglasses 1 suffer from the following disadvantages:

(1) When the hinge members 12 are mounted to the lens assembly 11, it is necessary to rotate the screws 13 relative to the lens assembly 11 and the hinge members 12 by a tool, such as a screwdriver (not shown).

(2) The screws 13 may be loosened from the lens assembly 11 due to frequent rotation of the hinge members 12 relative to the lens assembly 11, thereby resulting in separation of the lens assembly 11 and the hinge members 12.

(3) The screws 13 affect adversely the appearance of the eyeglasses 1.

SUMMARY OF THE INVENTION

The object of this invention is to provide a pair of screwless eyeglasses including a plurality of parts that can be firmly joined together with ease so that undesired detachment of the parts can be prevented.

According to this invention, a pair of screwless eyeglasses includes a lens assembly, two connecting rods, and two temples. The connecting rods extend respectively through two front slots in the lens assembly, and are inserted respectively into two rear slots in the temples. Two front stop units are connected respectively and fixedly to front end portions of the connecting rods, and abut respectively against two rear stop units fixed respectively within the front slots so as to prevent rearward removal of the connecting rods from the front slots. When the connecting rods rotate respectively about the front stop units toward each other so as to extend respectively through two notches in the lens assembly, the temples abut against each other.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
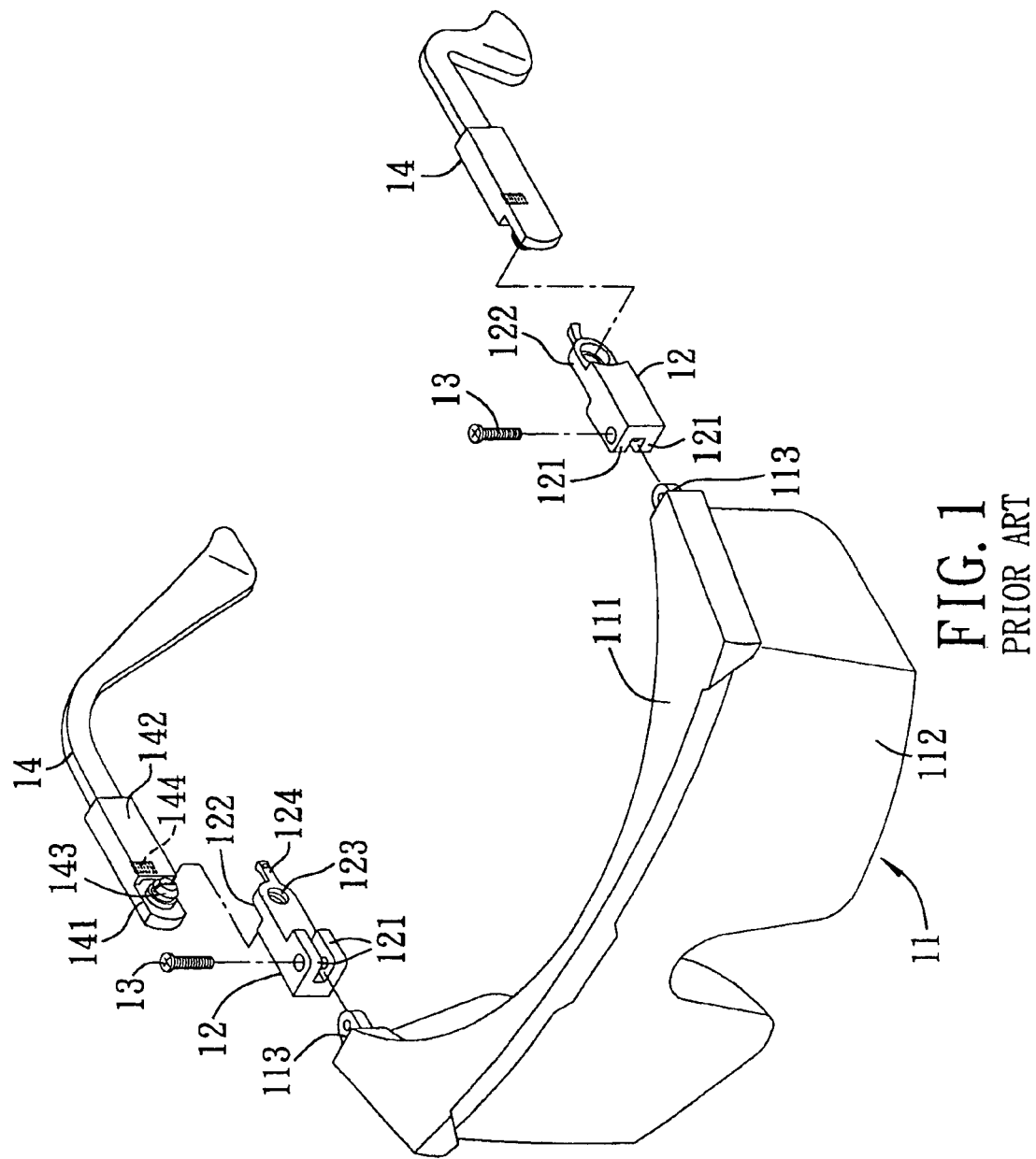
FIG. 1 is an exploded perspective view of a pair of conventional eyeglasses.
Figure 2:
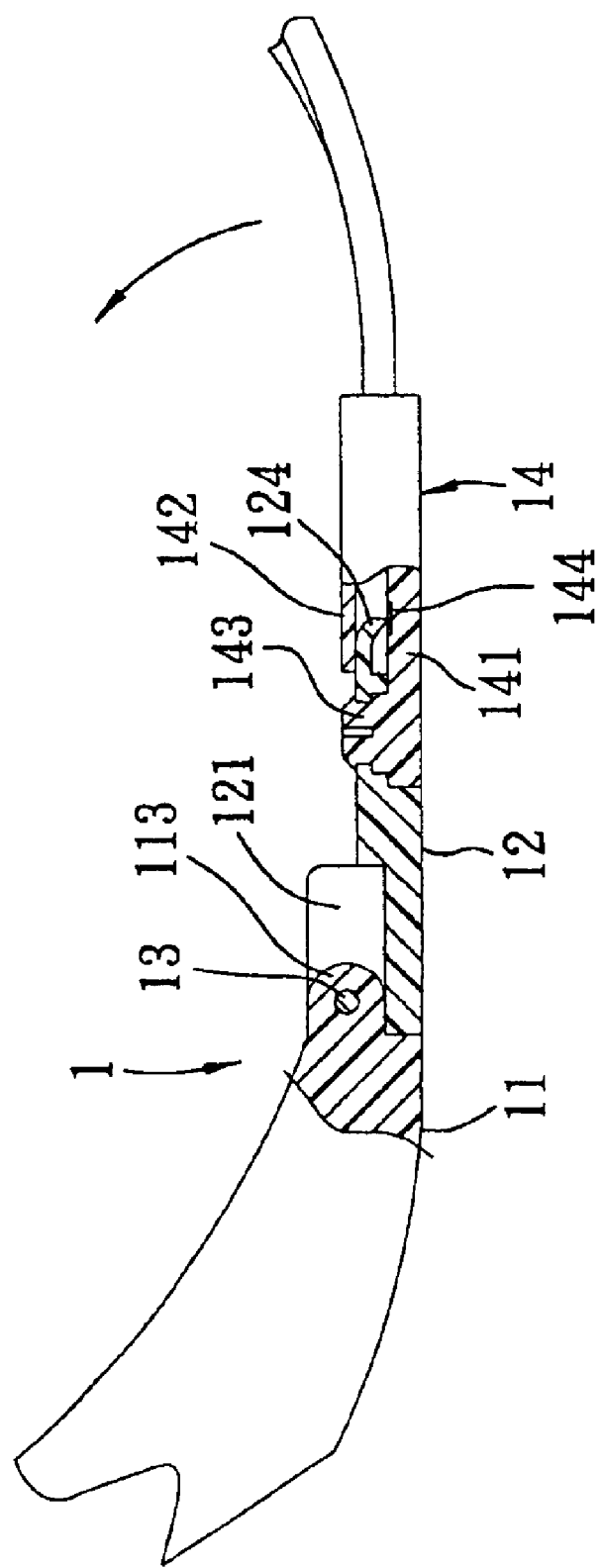
FIG. 2 is a fragmentary, partly sectional, top view of the conventional eyeglasses, illustrating connection between a hinge member and a temple.
Figure 3:
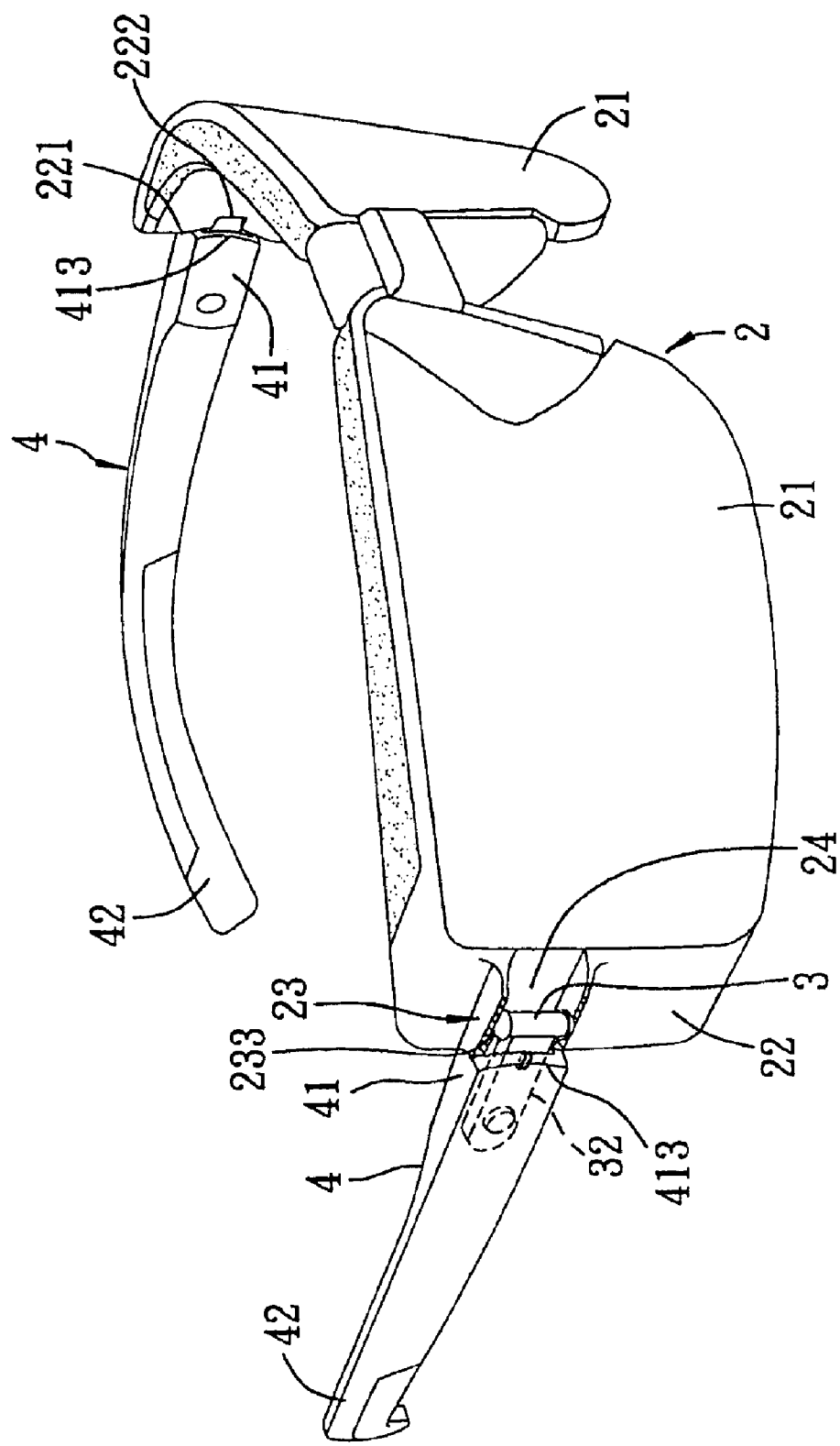
FIG. 3 is a partly sectional, assembled perspective view of the preferred embodiment of a pair of screwless eyeglasses according to this invention.
Figure 4:
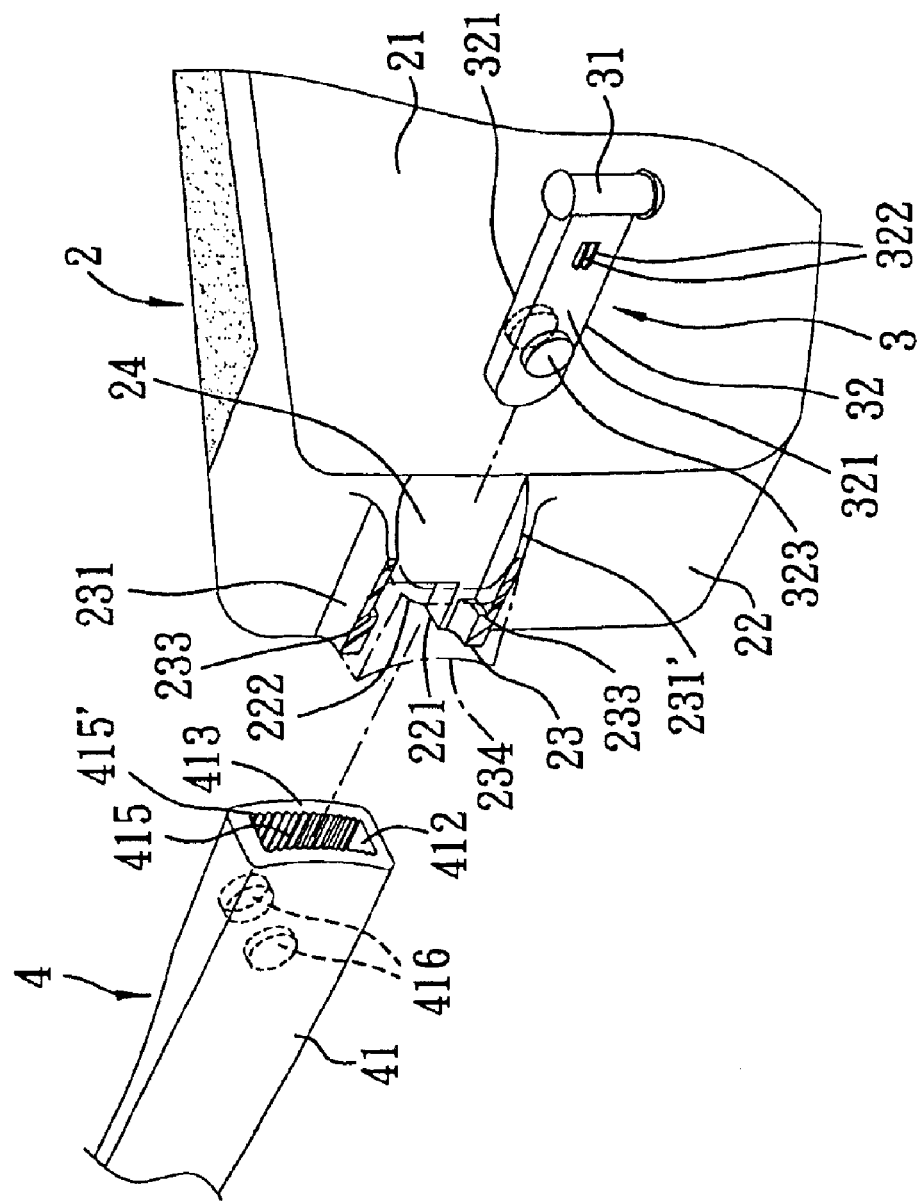
FIG. 4 is a fragmentary, partly sectional, exploded perspective view of the preferred embodiment.
Figure 5:
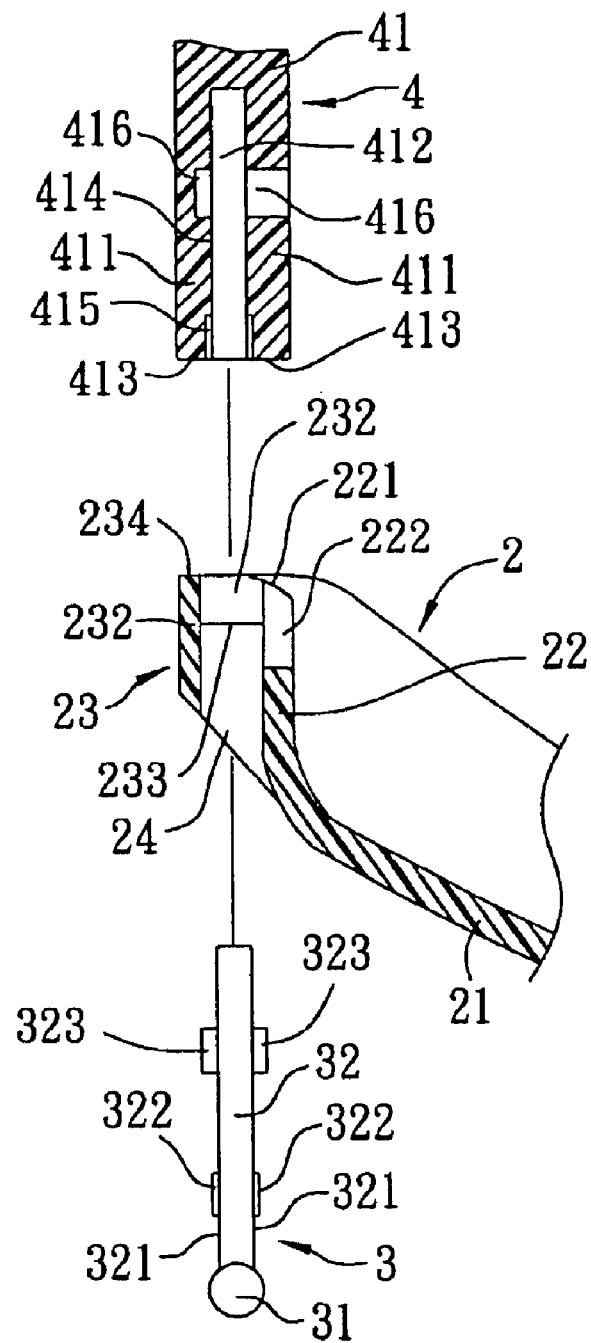
FIG. 5 is a fragmentary, sectional, exploded top view of the preferred embodiment.

Referring to FIGS. 3, 4, and 5, the preferred embodiment of a pair of screwless eyeglasses according to this invention is shown to include a lens assembly 2, a pair of left and right connecting rods 3, and a pair of left and right temples 4.

The lens assembly 2 includes a pair of interconnected left and right lens units 21, a pair of left and right side plates 22, and a pair of left and right mounting plates 23. The left and right Bide plates 22 extend respectively, integrally, and rearwardly from the left and right lens units 21. Each of the left and right mounting plates 23 has a U-shaped cross-section, and includes a pair of upper and lower horizontal walls 231, 231' extending integrally and outwardly from a corresponding one of the left and right side plates 22, and a vertical wall 232 having upper and lower ends formed respectively and integrally with the upper and lower horizontal walls 231, 231' to define a front slot 24 therebetween. Each of the left and right side plates 22 further has a curved and forwardly concave rear end surface 221, and a notch 222 formed in the rear end surface 221 and communicated with the corresponding front slot 24. Two rear stop units are disposed respectively within the front slots 24. Each of the rear stop units includes a pair of upper and lower projections 233 that extend respectively from a bottom surface of the upper horizontal wall 231 and a top surface of the lower horizontal wall 231'. The left and right mounting plates 23 have curved and forwardly concave rear end surfaces 234 that are aligned with the rear end surfaces 221 of the left and right side plates 22.

Each of the left and right temples 4 has a front end portion 41 for connection with the lens assembly 2 and the left and right connecting rods 3, and a rear end portion 42 adapted to be disposed on an ear of the wearer (not shown) Each of the front end portions 41 is annular, and has two spaced-apart parallel vertical walls 411 that define a rear slot 412 therebetween, and a curved and forwardly convex front end surface 413 that abuts against the rear end surface 221 of a corresponding one of the left and right side plates 22 and that has a curvature approximate to those of the rear end surfaces 221, 234 of the left and right side plates 22 and the left and right mounting plates 23. Each of the rear slots 412 extends along a longitudinal direction of a corresponding one of the left and right temples 4. Each of the vertical walls 411 has an inner surface 414 that is formed with a plurality of angularly equidistant positioning ribs 415 which are disposed in the corresponding rear slot 412 and which define a plurality of positioning grooves 415', each of which is formed between two adjacent ones of the positioning ribs 415. Two rear retaining units are disposed respectively within the rear slots 412 in the left and right temples 4. Each of the rear retaining units includes two aligned cylindrical grooves 416 that are formed respectively in inner surfaces 414 of the vertical walls 411. Each of the positioning ribs 415 extends along a radial direction of the corresponding rear retaining unit.

Each of the left and right connecting rods 3 includes a front stop unit 31 and a uniform-width rod body 32. The rod bodies 32 are configured as elongated vertical rectangular plates, extend respectively through the front slots 24 in the lens assembly 2, and are respectively inserted into and confined within the rear slots 412 in the left and right temples 4. Each of the rod bodies 32 has two opposite side surfaces 321, each of which is formed with two parallel positioning ribs 322 that engage respectively two selected ones of the positioning grooves 415' in a corresponding one of the left and right temples 4. Each of the positioning ribs 322 extends along a longitudinal direction of a corresponding one of the left and right connecting rods 3.

Figure 6:
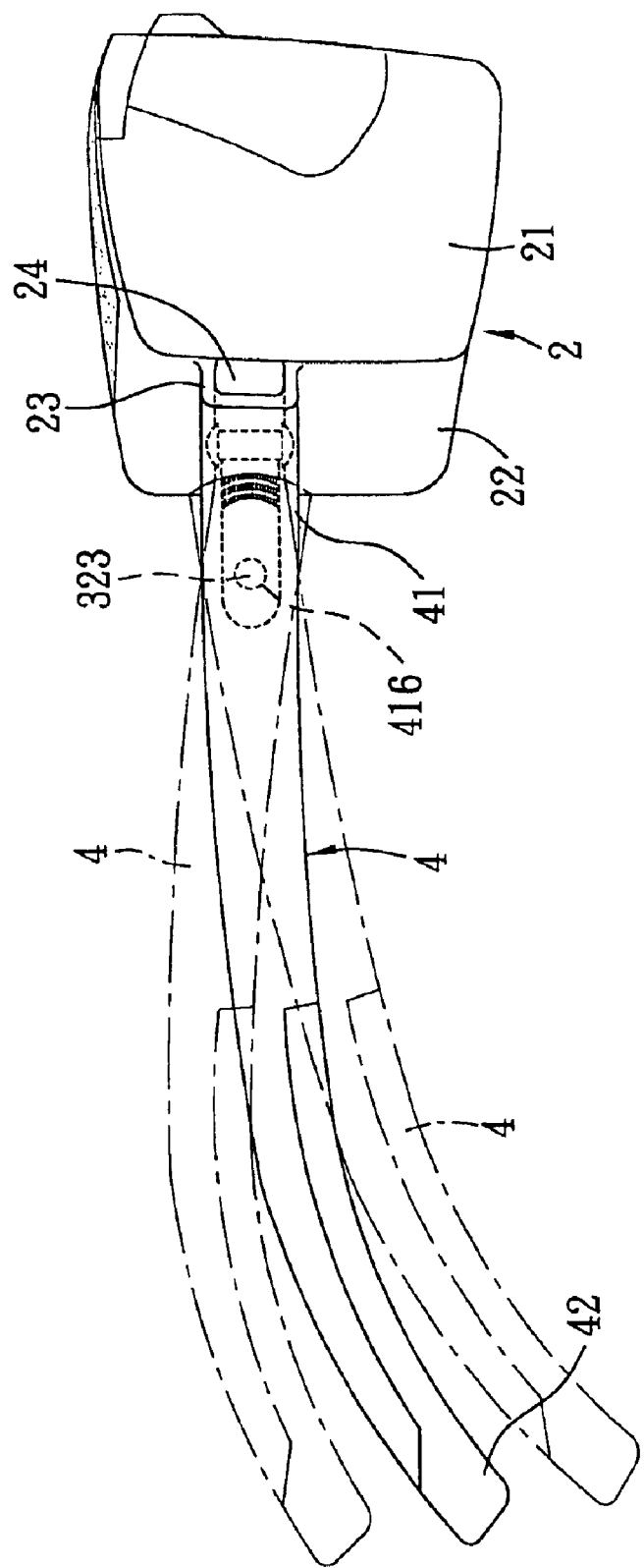
FIG. 6 is a schematic side view of the preferred embodiment, illustrating how the angle of a temple relative to a side plate of a lens assembly is adjusted.

The front stop units 31 are configured as vertical rods, and are formed respectively and integrally with and are disposed respectively in front of the rod bodies 32. Upper ends of the front stop units 31 are disposed above those of the rod bodies 32, and abut respectively against and are disposed respectively in front of the upper projections 233. Lower ends of the front stop units 31 are disposed below those of the rod bodies 32, and abut respectively against and are disposed respectively in front of the lower projections 233. As such, the front stop units 31 can cooperate with the upper and lower projections 233 so as to prevent rearward removal of the left and right connecting rods 3 from the front slots 24 in the lens assembly 2. Two front retaining units are disposed respectively on rear end portions of the left and right connecting rods 3. Each of the front retaining units includes two aligned cylindrical tongues 323 that are formed respectively and integrally with the side surfaces 321 and that are received respectively, fittingly, and rotatably within the cylindrical grooves 416 in a corresponding one of the left and right temples 4. As such, removal of the left and right temples 4 from the left and right connecting rods 3 can be prevented. Furthermore, each of the left and right temples 4 is rotatable forcibly about the corresponding cylindrical tongues 323 so as to adjust the angles of the left and right temples 4 relative to the left and right side plates 22, as shown in FIG. 6.

Figure 7:
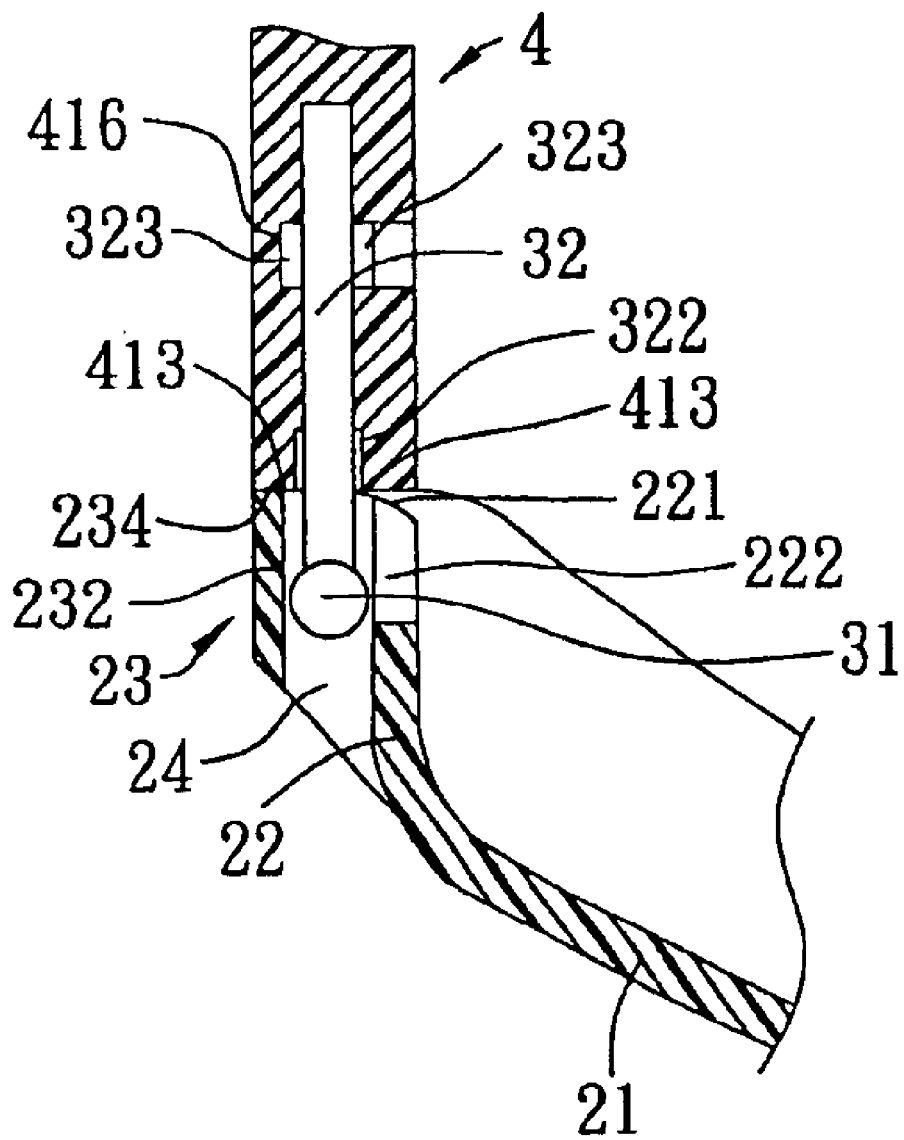
FIG. 7 is a fragmentary sectional top view of the preferred embodiment, illustrating how the temple is disposed at an unfolded position.
Figure 8:
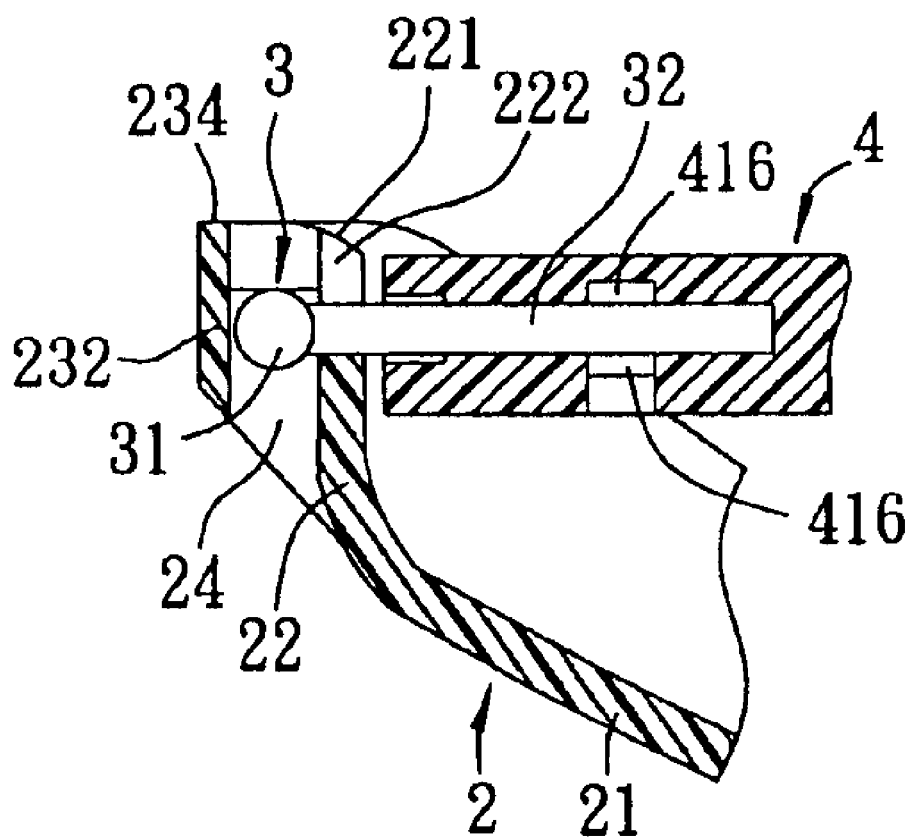
FIG. 8 is a fragmentary sectional top view of the preferred embodiment, illustrating how the temple is disposed at a folded position.

The left and right connecting rods 3 can rotate respectively about the front stop units 31 toward each other so as to permit the left and right temples 4 to turn inwardly from unfolded positions shown in FIG. 7 to folded positions shown in FIG. 8, where the left and right connecting rods 3 extend respectively through the notches 222 in the left and right side plates 22.

Because the curved and forwardly convex front end surfaces 413 of the left and right temples 4 abut against the curved and forwardly concave rear end surfaces 221, 234 of the left and right side plates 22 and the left and right mounting plates 23, the left and right temples 4 can be connected firmly to the lens assembly 1. Furthermore, when the left and right temples 4 rotate relative to the lens assembly 2, the front end surfaces 413 of the left and right temples 4 can move smoothly on the rear end surfaces 221, 234 of the left and right side plates 22 and the left and right mounting plates 23.

With this invention thus explained, it is apparent that numerous modifications and variations can be made without departing from the scope and spirit of this invention. It is therefore intended that this invention be limited only as indicated by the appended claims.

I claim:

1. Screwless eyeglasses comprising:
 a lens assembly including a pair of interconnected left and right lens units, a pair of left and right side plates extending respectively, integrally, and rearwardly from said left and right lens units, and a pair of left and right mounting plates, each of which is connected fixedly to a corresponding one of said left and right side plates to define a front slot therebetween, each of said left and right side plates further having a rear end surface, and a notch formed in said rear end surface and communicated with said front slot, said lens assembly further including two rear stop units disposed respectively within said front slots;
 a pair of left and right temples; and
 a pair of left and right connecting rods extending respectively through said front slots in said lens assembly and connected respectively to said left and right temples, each of said left and right connecting rods having a front end portion with a front stop unit that is disposed in front of and that abuts against a corresponding one of said rear stop units of said lens assembly so as to prevent rearward removal of said left and right connecting rods from said front slots in said lens assembly, said left and right connecting rods being rotatable respectively about said front stop units toward each other so that said left and right temples turn to folded positions, where said left and right temples abut against each other and where said left and right connecting rods extend respectively through said notches in said left and right side plates.

2. The screwless eyeglasses as claimed in claim 1, wherein each of said left and right temples has a front end surface that is formed with a rear slot extending along a longitudinal direction of a corresponding one of said left and right temples, and a rear retaining unit disposed within said rear slot, each of said left and right connecting rods further having a rear end portion that is inserted into said rear slot in the corresponding one of said left and right temples and that is formed with a front retaining unit, one of said front retaining unit of said left connecting rod and said rear retaining unit of said left temple being configured as a tongue, the other one of said front retaining unit of said left connecting rod and said rear retaining unit of said left temple being configured as a groove that engages fittingly said tongue of said one of said front retaining unit of said left connecting rod and said rear retaining unit of said left temple so as to prevent removal of said left temple from said left connecting rod and so as to permit rotation of said left temple relative to said left connecting rod about said front retaining unit of said left connecting rod and said rear retaining unit of said left temple, one of said front retaining unit of said right connecting rod and said rear retaining unit of said right temple being configured as a tongue, the other one of said front retaining unit of said right connecting rod and said rear retaining unit of said right temple being configured as a groove that engages fittingly said tongue of said one of said front retaining unit of said right connecting rod and said rear retaining unit of said right temple so as to prevent removal of said right temple from said right connecting rod and so as to permit rotation of said right temple relative to said right connecting rod about said front retaining unit of said right connecting rod and said rear retaining unit of said right temple.

3. The screwless eyeglasses as claimed in claim 2, wherein said tongues are cylindrical, each of said left and right temples having an annular front end portion that is formed with two spaced-apart parallel vertical walls that define said rear slots in the corresponding one of said left and right temples therebetween, each of said vertical walls having an inner surface that is formed with a plurality of angularly equidistant positioning ribs which are disposed in said rear slot in the corresponding one of said left and right temples and which define a plurality of positioning grooves, each of which is disposed between two adjacent ones of said positioning ribs, each of said positioning ribs extending along a radial direction of a corresponding one of said rear retaining units, each of said left and right connecting rods having two opposite side surfaces, each of which is formed with two parallel positioning ribs that engage respectively two selected ones of said positioning grooves in said left and right temples, each of said positioning ribs of said left and right connecting rods extending along a longitudinal direction of a corresponding one of said left and right connecting rods.

4. The screwless eyeglasses as claimed in claim 3, wherein said left and right mounting plates have curved rear end surfaces that are forwardly concave, said rear end surfaces of said left and right side plates being curved and forwardly concave, said front end surfaces of said left and right temples abutting against said rear end surfaces of said left and right side plates and said left and right mounting plates, said front end surfaces of said left and right temples being curved and forwardly convex and having a curvature that is approximate to those of said rear end surfaces of said left and right side plates and said left and right mounting plates so as to facilitate firm connection between said lens assembly and said left and right temples, whereby, when said left and right temples rotate relative to said lens assembly, said front end surfaces of said left and right temples can move smoothly on said rear end surfaces of said left and right side plates and said left and right mounting plates.

5. The screwless eyeglasses as claimed in claim 1, wherein each of said left and right mounting plates has a U-shaped cross-section, and has a pair of upper and lower horizontal walls extending integrally and outwardly from a corresponding one of said left and right side plates, and a vertical wall having upper and lower ends formed respectively and integrally with said upper and lower horizontal walls, each of said rear stop units of said lens assembly including a pair of upper and lower projections that extend respectively from a bottom surface of said upper horizontal wall and a top surface of said lower horizontal wall, each of said left and right connecting rods including a uniform-width rod body, said front stop units of said left and right connecting rods being configured as vertical rods that are formed respectively and integrally with and that are disposed respectively in front of said rod bodies of said left and right connecting rods and that have upper ends disposed above those of said rod bodies and abutting respectively against and disposed respectively in front of said upper projections, and lower ends disposed below those of said rod bodies and abutting respectively against and disposed respectively in front of said lower projections.

\* \* \* \* \*